United States Patent Office 2,847,315
Patented Aug. 12, 1958

2,847,315

SEALING COMPOSITION

Earl M. Turner, Chatham, N. J., assignor to Mohawk Industries, Inc., Sparta, N. J., a corporation of New Jersey No Drawing. Application September 26, 1955
Serial No. 536,768

5 Claims. (Cl. 106—123)

My invention refers to a sealing composition and more particularly to a heat resistant sealing and caulking compound for joints, openings, fissures, or cracks in walls, streets and the like.

Caulking and sealing compositions as heretofore used contain ingredients which either absorb moisture, swell, and become soggy and run or they dry relatively quickly so that the compositions become hard or cakey and crack thereby falling short of the requirements of a good sealing and caulking compound.

In accordance with my invention, I provide a composition which will avoid the above noted disadvantages.

It is therefore an object of my invention to provide a sealing and caulking compound which is heat resistant, will dry and form a hard exterior, integument or skin while the interior remains relatively mastic.

Another object of my invention is to provide a sealing compound which can be readily applied to fill joints of concrete or cement slabs and forms a protective filling against water, ice and the natural elements, thereby avoiding cracking of the slabs.

Still another object of the invention is to provide a caulking compound which when applied to a joint or fissure forms a natural cohesive seal which adheres firmly to all parts of the joint and will expand and contract to the same degree of expansion and contraction of the material to which the compound is applied.

A further object of my invention is to provide a mastic, sealing compound resistant to heat, water, oil, petroleum and its derivatives, and whose surface readily dries forming a tough skin, leaving the interior below the skin soft and pliable, so that if the surface is ruptured the newly exposed portion thereof will become hardened thereby sealing itself again.

Other objects and features of the invention will become apparent from the following detailed description which is illustrative but not restrictive of my invention.

I have found that a composition according to my invention containing diatomaceous earth or clay, asbestos, tall oil, petroleum residues, cationic compounds, driers and balata resin acts as heat resistant caulking or sealing compounds which form a very tough but plastic mass and which when exposed to normal atmospheric pressure forms a regulated surface skin resistant to water and petroleum products such as lubricating oils, jet fuels, and the like.

The range of formula of my composition according to my invention is listed as follows:

| | Parts by weight |
|---|---|
| Asbestos | 2–5 |
| Diatomaceous earth or clay | 1–3 |
| Tall oil | 1.5–4.0 |
| Petroleum oil residue | 1.5–4.0 |
| Cationic compound | 0.1–0.3 |
| Drier | 0.1–0.3 |
| Balata resin | 0.1–0.3 |

With said range above given I have found the following specific formula most effective in meeting the requirements of a good caulking and sealing composition:

| | Parts by weight |
|---|---|
| Asbestos | 3 |
| Diatomaceous earth | 1.6 |
| Tall oil | 2.5 |
| Petroleum oil residue | 2.5 |
| Cationic compound | 0.2 |
| Drier | 0.2 |
| Balata resin | 0.25 |

The ingredients above are mixed together in the order given at an ordinary temperature or upon slight elevation of heat.

The asbestos and diatomaceous earth are inert, fire resistant and insoluble in water, oils, petroleum derivatives and ordinary solvents. The tall oil and petroleum residue act as plasticizers for the diatomaceous earth and clay and in conjunction with the balata resin act as a bonding agent. The cationic agent which may be quaternary ammonium compounds, such as the chloride and cetyl trimethyl ammonium bromide, acts as a link between the composition and the surface or crack or fissure to which it is applied, and furthermore combines with any moisture present in such fissure. The driers used may be cobalt oxide, lead oxide, resinate of manganese, cobalt, lead and zinc, which react with the tall oil and the resin to form a skin on the air exposed surface of the composition so that the composition retains its original consistency and condition below the depth of the skin formed upon application so that if the skin were ruptured, the newly exposed portion of the composition will form a new protective skin and become hardened. It is apparent that a composition of the type disclosed herein is mastic or plastic and may be applied at ordinary temperatures by the use of normal air pressure discharging equipment. When the composition is exposed to normal atmospheric temperature it forms a regulated skin surface which is highly resistant but at the same time yieldable to the form or surface to which applied. Said composition has adhesive and cohesive strength to the extent that it forms a bond between the joints; for example, on concrete surfaces and will expand and contract to the same degree as that of the concrete because of changing weather conditions without rupturing the film. Because of the characteristics of this composition, moisture, dust and other foreign matter does not enter the concrete joints.

The composition has found wide use particularly in air strips from which jet planes fly. Such composition applied between the slabs of the concrete forming the air strip is resistant to the heat blasts from jet propelled planes. I have found that heat up to 800° F. applied to the composition for 1 hour merely carbonized the skin but did not affect the interior portion thereof nor did the excessive heat affect the qualities of the composition. The composition made according to my invention has no specific melting or congealing point and can be mixed at ordinary temperatures. Furthermore, it will withstand extremes of heat. The composition according to my invention is very slowly and slightly soluble on long standing so as to produce a swelling of the same. Once the skin forms, no more water is absorbable by the composition so that it remains water insoluble. It is to be noted that the drier acts as a catalyst whereby the tall oil fatty acid is regulated by the percentage of drier present in the composition.

While a preferred embodiment of the invention has been described, it is to be understood that modifications as to form, use of ingredients, or their order of mixing may be made without departing from the spirit and scope of the invention.

I claim:
1. A sealing and caulking compound consisting of asbestos 2 to 5 parts by weight, diatomaceous earth 1 to 3 parts by weight, tall oil 1.5 to 4.0 parts by weight, petroleum oil residue 1.5 to 4.0 parts by weight, a quaternary ammonium compound 0.1 to 0.3 part by weight, a drier selected from the group consisting of lead oxide and cobalt oxide 0.1 to 0.3 part by weight, and balata resin 0.1 to 0.3 part by weight, said weights being approximate.

2. A compound for caulking consisting of asbestos 2 to 5 parts by weight, diatomaceous earth 1 to 3 parts by weight, tall oil 1.5 to 4.0 parts by weight, petroleum oil residue 1.5 to 4.0 parts by weight, a quaternary ammonium compound 0.1 to 0.3 part by weight, a drier selected from the group consisting of cobalt oxide, lead oxide, a resinate of manganese, of cobalt, of lead, and of zinc, 0.1 to 0.3 part by weight and balata resin 0.1 to 0.3 part by weight.

3. A sealing and caulking compound consisting of asbsetos 3 parts by weight, diatomaceous earth 1.6 parts by weight, tall oil 2.5 parts by weight, petroleum oil residue 2.5 parts by weight, a quaternary ammonium compound 0.2 part by weight, a drier selected from the group consisting of cobalt oxide and lead oxide 0.2 part by weight, and balata resin 0.25 part by weight.

4. A sealing and caulking compound consisting of asbestos 3 parts by weight, diatomaceous earth 1.6 parts by weight, tall oil 2.5 parts by weight, petroleum oil residue 2.5 parts by weight, quaternary ammonium chloride 0.2 part by weight, a drier selected from the group consisting of lead oxide and cobalt oxide 0.2 part by weight, and balata resin 0.25 part by weight.

5. A sealing composition for the adjacent edges of runway slabs, consisting essentially of a major portion of a fine resistant mixture of asbestos and a member selected from the group consisting of clay and diatomaceous earth, and a portion consisting of a tall oil, petroleum oil residue and balata resin for plasticizing said first portion, a cationic agent selected from the group consisting of a quaternary ammonium chloride, cetyl trimethyl ammonium bromide, at least one drier selected from the group consisting of lead oxide, cobalt oxide, a resinate of manganese, of cobalt, of lead and of zinc, said composition on exposure to air forming a skin resistant to water and heat, yet being contractible and expandable due to change in heat conditions.

References Cited in the file of this patent
UNITED STATES PATENTS

| | | |
|---|---|---|
| 1,813,992 | Finley | July 14, 1931 |
| 1,948,906 | Dunford | Feb. 27, 1934 |
| 1,982,231 | Parrett | Nov. 27, 1934 |
| 1,990,474 | Alvarado | Feb. 12, 1935 |
| 2,180,971 | Taggart et al. | Nov. 21, 1939 |
| 2,427,488 | Anderson et al. | Sept. 16, 1947 |
| 2,442,972 | Edelstein | June 8, 1948 |